United States Patent [19]  
Borromeo

[11] Patent Number: 4,903,542  
[45] Date of Patent: Feb. 27, 1990

[54] BICYCLE HANDLEBAR ASSEMBLY, PARTICULARLY FOR SPORTS BICYCLES

[75] Inventor: Lucio Borromeo, Turin, Italy

[73] Assignee: 3T S.p.A., Turin, Italy

[21] Appl. No.: 294,708

[22] Filed: Oct. 9, 1989

[30] Foreign Application Priority Data

Jan. 7, 1988 [IT] Italy ............................ 52802/88[U]

[51] Int. Cl.⁴ .............................................. B62K 21/12
[52] U.S. Cl. .................................. 74/551.8; 74/551.1; 74/489
[58] Field of Search ............... 74/551.1, 551.3, 551.4, 74/551.5, 551.6, 551.8, 489, 488; 188/2 D, 24.11; 403/11, 13, 14

[56] References Cited

U.S. PATENT DOCUMENTS 2,641,977  6/1953  Uji et al. ..................... 74/500.5 X
3,481,218 12/1969  Yoshikawa ..................... 74/551.3
4,023,436  5/1977  Dodge ........................... 74/551.3
4,729,255  3/1988  Moulton ......................... 74/551.3

FOREIGN PATENT DOCUMENTS 557018  4/1923  France ............................ 74/489
473690  8/1952  Italy ............................. 188/2 D Primary Examiner—Rodney M. Lindsey
Attorney, Agent, or Firm—Sughrue, Mion, Zinn, Macpeak & Seas

[57] ABSTRACT

Bicycle handlebar which are intended to be coupled, in use, to at least one auxiliary element, such as a support element or a brake-operating lever, in a selectively adjustable coupling position is provided with a graduated scale in correspondence with the region of coupling to the at least one auxiliary element for the selective determination of the coupling position.

6 Claims, 1 Drawing Sheet

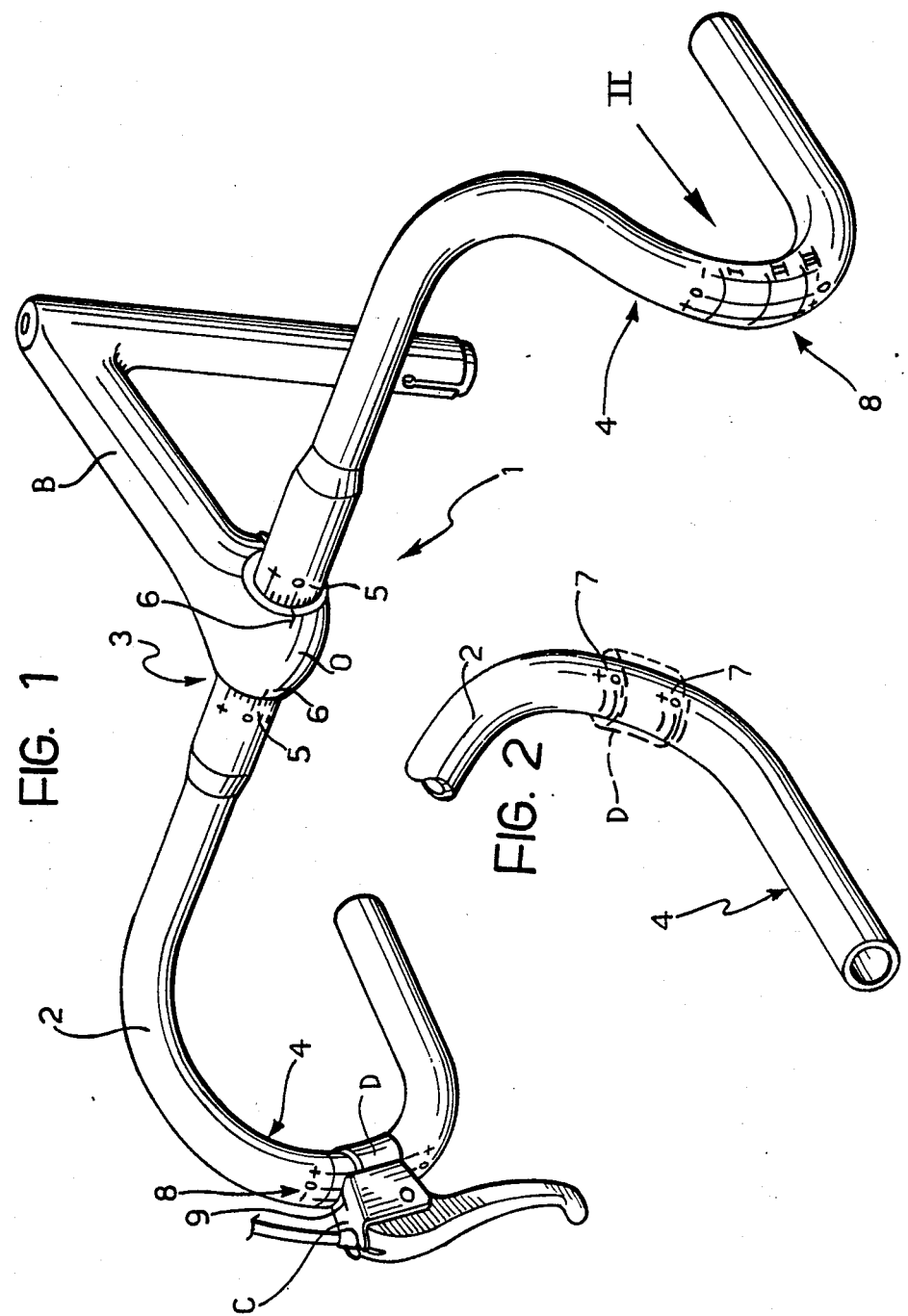

4,903,542

BICYCLE HANDLEBAR ASSEMBLY, PARTICULARLY FOR SPORTS BICYCLES

BACKGROUND OF THE INVENTION

The present invention relates to a bicycle handlebar assembly and particularly concerns a bicycle handlebar which is intended to be coupled, in use, to at least one auxiliary element in a selectively-adjustable coupling position.

The invention has been developed with particular attention to its possible use on sports bicycles. For this application, the auxiliary elements referred to are normally constituted by:

the so-called steering column or handlebar support provided at its front end with an eyelet which is intended to be traversed by the central part of the handlebar and then tightened (for example, by means of a screw) in a position in which it clamps the handlebar, and the two brake levers, each provided with a clip which is intended to be fitted onto one of the side parts or handles of the handlebars and then tightened so as to hold the lever in a fixed position relative to the handlebar.

The position in which the auxiliary elements is coupled to the handlebar can be adjusted selectively in dependence on the tastes or habits of the user.

The position in which the handlebar are fixed to the column or support can be adjusted by the rotation of the central part of the handlebars relative to the eyelet of the column or support by means of an orientation movement about an axis which, in use, is generally horizontal.

As regards the brake levers, they can generally be adjusted both in height (the lever can be located at different heights along the side handle of the handlebar) and in horizontal orientation (the horizontal angular position of the levers relative to the handles of the handlebar can be varied)

When the above adjustments are carried out (after the eyelet of the column or support and/or the clips of the brake levers have been loosened) it is generally not very easy, even for an expert user, immediately to find the preferred adjustment position.

This fact becomes particularly important, for example, in sporting competitions, when a cyclist has to change bicycles unexpectedly and receives another whose various parts are not adjusted to his own tastes.

For this purpose, entirely empirical means are sometimes used, for example, the desired position of the brake levers being found by means of pieces of string or wire whose lengths correspond to a reference mounting position.

SUMMARY OF THE INVENTION

The object of the present invention is to remedy the above disadvantages of use by the provision of a bicycle handlebar assembly in which the position of coupling to the auxiliary elements, such as the column or support and the brake levers, can be determined (and found again) quickly under any conditions of use.

According to the present invention, this object is achieved by virtue of a bicycle handlebar of the type specified above, characterised in that a graduated scale is provided in correspondence with the region of coupling to the at least one auxiliary element for the selective determination of the coupling position.

In general, the handlebar according to the invention is provided, in correspondence with the regions of coupling to the column or support and the brake levers, with graduated scales which enable a desired adjustment position to be identified and found again rapidly by means of a reference element (constituted, for example, by one or more notches provided on the eyelet of the column or support or by the upper and lower ends of the mounting clips of the brake levers, by notches provided on the levers themselves, etc.).

Naturally, a solution is also possible — and therefore fully included within the scope of the present model — in which the actual graduated scale is provided on the auxiliary elements, whilst reference elements (marks) for enabling the adjustment operation are provided on the handlebar.

BRIEF DESCRIPTION OF THE DRAWINGS

Further characteristic and advantages of the present invention will become clear from the detailed description which follows with reference to the appended drawings, provided by way of non-limiting example, in which:

FIG. 1 is a general perspective view of a handlebar assembly according to the invention, shown with some of the auxiliary elements normally associated therewith in use, and FIG. 2 is another perspective view showing, on an enlarged scale, the part of FIG. 1 indicated by the arrow II from an observation point approximately opposite that of FIG. 1.

DETAILED DESCRIPTION OF THE INVENTION

In FIG. 1, a bicycle handlebar assembly, typically for sports bicycles, is generally indicated 1. The handlebar 2 is constituted by a shaped tube in which can be seen a central portion 3 intended to be connected to a steering column or support B, and two symmetrical side arms or handles 4 on which the brake levers C are mounted by means of a widely known solution, only one lever C being shown in FIG. 1 for reasons of clarity.

The handlebar is coupled to the column or support B by the insertion of the central portion 3 of the handlebar 2 into a horizontal hole provided in the front part or eyelet 0 of the column or support B.

According to a widely known solution, the handlebar 2 is held in a fixed position relative to the column or support B as a result of the tightening of the eyelet 0 effected by screw means, not visible in the drawings.

In a substantially similar manner, each lever C is provided with a tubular clip D which can be fitted around the corresponding handle 4 of the handlebar 2 and then tightened and clamped to the handle — also by means of a widely—known solution — by screw tightening means, not visible in the drawings.

If the eyelet 0 of the column or support B and/or the clips D of the brake levers C are loosened slightly, it is possible to achieve a general adjustment of the handlebar in terms of:

an adjustment of the orientation of the handlebar 2 relative to the column or support B, which corresponds to a rotation (about a horizontal axis) of the central part 3 of the handlebar 2 in the eyelet 0 of the column or support B, an adjustment of the height of the mounting position of the brake levers C relative to the side handles 4 of the handlebar, and an adjustment of the horizontal orientation (in the sense of a horizontal swivelling) of the brake levers C relative to the side handles 4 of the handlebar 1.

In order to facilitate the first adjustment movement (the rotation of the central part 3 in the eyelet 0) in the handlebar according to the invention, there is a graduated scale 5 on the central portion 3 of the handlebar, on one or both sides of the column or support B, which has a central (or "0") position and respective adjustment notches for increasing (+) and decreasing (−) the angle between the handlebar 2 and the column or support B.

The latter, or more precisely the eyelet 0 which surrounds the central part 3 of the handlebar, is provided (again on just one or on both sides) with a reference element (e.g. a notch 6) whose location relative to the scale 5 on the handlebar 2 enables the adjustment position of the handlebar relative to the column or support B to be identified unequivocally.

Naturally, as already stated in the introduction to the present specification, it is also possible (and therefore entirely within the scope of the present invention) for the graduated scale 5 to be provided on the column or support B and the reference element 6 to be on the handlebar 2.

Further graduated scales, indicated 7 in FIG. 2, are provided on both handles 4 of the handlebar 2 on their inner or rear sides.

These are usually double scales, including two homologous 0 positions and respective increase (+) and decrease (−) notches.

The scales 7 enable the adjustment of the height at which the brake levers C are fitted to the two handles 4 of the handlebar 2.

The adjustment is carried out by the observing the position reached by one or both ends (upper and lower) of the clip D relative to the scale 7. In this case, therefore, it is the ends of the clip D which can act as reference elements.

Finally, two further graduated scales, indicated 8, are provided on the fronts of the side handles 4 of the handlebar 2 and are substantially coextensive therewith.

More precisely, each scale 8 is constituted by a central (or "0") line which extends vertically along the front of the respective handle 4 and by at least two side lines, for increasing ("+") and decreasing ("−") respectively, which extend alongside the 0 line on its inside and outside respectively relative to the general shape of the handlebar 2.

With the use of a reference element, such as a notch 9 provided on the supports of the brake levers C (see FIG. 1) the horizontal orientation of the levers C can be varied selectively and the desired adjustment position can easily be found again.

In the embodiment illustrated in the drawings, in addition to the vertical lines, the scale 8 includes three further horizontal lines, indicated I, II and III, situated at different heights on the fronts of the side handles 4 of the handlebar 2.

The lines I, II, III are intended to be used as references when a hole is to be formed in the handles 4, at a clearly identifiable required height, to enable a flexible element, such as, for example, the flexible brake-operating cables controlled by the levers C, to pass into the handlebar.

In general, the presence of the reference lines I, II and II, like the presence of the scales 7 on the rears of the handles 4, facilitates the adjustment of the levers C as regards the possibility of bringing the two levers C provided on the two sides of the handlebar to exactly the same height.

Naturally, the scope of the present invention extends to models which achieve equal utility by means of the same innovative concept.

What is claimed is:

1. A bicycle handlebar assembly comprising:
support means,
a handlebar having a substantially horizontally disposed center portion adjustably supported by said support means for rotation relative thereto,
first scale means located on one of said handlebar and support means and complementary indicator means located on the other of said handlebar support means for indicating the angular orientation of said handlebar relative to said support means, said handlebar having a side handle portion at each end of said center portion, each side handle portion having a substantially vertically disposed portion,
brake operating lever means adjustably mounted on each vertically disposed portion and
second scale means located on each vertically disposed portion for cooperation with a respective brake operating lever means for indicating the vertical position of each brake operating lever means relative to said vertically disposed portion.

2. A bicycle handlebar assembly as set forth in claim 1 wherein said second scale means is provided on an inner, rearwardly facing surface of said vertically disposed portion.

3. A bicycle handlebar assembly as set forth in claim 1 further comprising third scale means located on one of said vertically disposed portion and said lever means and indicator means located on the other of said vertically disposed portion and said lever means for indicating the rotational orientation of said lever means relative to said vertically disposed portion.

4. A bicycle handlebar assembly as set forth in claim 3, wherein said third scale means is comprised of a graduated scale having a set of generally vertically disposed adjustment lines.

5. A bicycle handlebar assembly as set forth in claim 4, wherein said third scale means includes a set of generally horizontal adjustment lines useable as guides for the making of holes in the side handles of said handlebar.

6. A bicycle handlebar assembly as set forth in claim 3, wherein said third scale means is provided on an outer, forwardly facing surface of said vertically disposed portion.

* * * * *